United States Patent Office 2,828,347
Patented Mar. 25, 1958

2,828,347

CATALYTIC POLYMERIZATION OF OLEFINS

John Paul Hogan and William C. Lanning, Bartlesville, Okla., assignors to Phillips Petroleum Company, a corporation of Delaware No Drawing. Application April 27, 1953
Serial No. 351,520

10 Claims. (Cl. 260—683.15)

This invention relates to a process for the polymerization of olefinic hydrocarbons to form a polymer boiling in the motor fuel range, to a novel polymerization catalyst, and to a method of preparing the catalyst.

The conversion of olefinic hydrocarbons to hydrocarbons of higher molecular weight by polymerization is well known. Catalysts of nickel oxide supported on a carrier of silica and promoted with alumina have been found to be very effective in the polymerization of low-boiling olefins such as ethylene and propylene, which are difficult to polymerize. However, the nickel oxide catalyst, as described in U. S. Patents 2,581,228 and 2,381,198, has been found to be gradually deactivated or poisoned by various materials present in the olefin-containing feed stream. Poisons found in olefin-containing streams include sulfur compounds, carbon monoxide, butadiene, acetylene, and the like. Purification of this feed stream is necessary when polymerizing the same over nickel oxide type catalysts and it is difficult and costly since the presence of extremely small quantities of some of these poisons is sufficient to greatly reduce the effectiveness of the nickel oxide catalyst. For example, the presence of only 0.04 mol percent carbon monoxide in an ethylene-propylene feed stream results in the poisoning of a nickel oxide catalyst at a rate of approximately 5 percent per hour. Unfortunately, the removal of carbon monoxide from the olefin-containing stream is the most costly purification process encountered in the polymerization of olefins over nickel oxide type catalysts.

The principal object of the invention is to provide an improved process for the polymerization of low-boiling olefins to motor fuel boiling range polymers.

An object of the invention is to provide a novel catalyst for the polymerization of low-boiling olefins to polymers boiling in the motor fuel boiling range.

A further object of the invention is to provide a polymerization catalyst which resists poisoning by the impurities ordinarily found in olefin-containing streams.

It is also an object of this invention to provide a method for preparing a polymerization catalyst which is resistant to poisoning by carbon monoxide present in the feed stream.

Other objects of the invention will become apparent from a consideration of the accompanying disclosure.

We have discovered that olefins can be polymerized to polymers boiling in the motor fuel range in a markedly improved manner by means of a catalyst comprising nickel chloride supported on a carrier of silica-alumina. The nickel chloride employed as the sole effective catalytic element in accordance with the present invention is in an active form as a result of activation by heating at a temperature in the range of 300 to 700° C. in a stream of dry air, or other dry inert gas, for an extended period. The catalyst support is preferably a composition comprising from 50 to 99 weight percent silica and 1 to 50 weight percent alumina, but any mixture of silica and alumina containing substantial amounts of both constituents is effective, in combination with nickel chloride, in the polymerization of light olefins to polymeric hydrocarbons boiling in the gasoline range. A support containing 90 weight percent silica and 10 weight percent alumina is particularly effective.

We have also found the nickel chloride catalyst of the invention to have an increased activity over a catalyst of nickel oxide supported on silica-alumina for the polymerization of olefins. We have further found the nickel chloride catalyst of the invention to have increased resistance to carbon monoxide poisoning as compared to a catalyst of nickel oxide supported on silica-alumina. Thus, the novel nickel chloride catalyst of the the invention, supported on silica-alumina, is more effective and has longer life than previously known nickel-containing catalysts used for the polymerization of olefins to polymers boiling in the motor fuel range.

The nickel chloride content of the catalyst of the invention may vary widely from 0.1 percent by weight upwardly to a practical upper limit of about 35 weight percent of the support, expressed as elemental nickel. Generally, the nickel chloride content ranges from 0.1 to 6 weight percent calculated as elemental nickel and based on the silica-alumina support. The silica-alumina support preferably contains predominantly silica as a base constituent which is preferably in the range of 50 to 99 weight percent of the support. The alumina content preferably ranges from 1 to 50 weight percent.

Our new catalyst may be prepared by a variety of chemical routes, the essential feature of the preparation being to obtain nickel chloride on the silica-alumina support and to activate the catalyst by heating the same at an elevated temperature in a dry gaseous ambient, inert under activating conditions. As a preferred method of preparation, a silica-alumina support of suitable physical properties, such as a 90 silica-10 alumina coprecipitated cracking catalyst, is impregnated with nickel chloride and dried and activated by heating in a stream of dry air. Although the catalyst may be prepared from the original chemical compound of nickel chloride, a conventional polymerization catalyst of nickel oxide supported on silica-alumina, including deactivated nickel oxide catalyst, may be converted to our improved catalyst by treatment with hydrochloric acid, chlorine, ammonium chloride, or other chlorine-containing compounds. A hydrogenation catalyst of elemental nickel on a silica-alumina support can also be converted to the catalyst of the invention by similar treatment. Almost any of the various forms of catalyst supports comprising a substantial amount of silica and a minor amount of alumina may be used in the preparation of the catalyst. A silica-alumina cracking catalyst containing 90 weight percent silica and 10 weight percent alumina has optimum characteristics in the process of the invention.

The activation of our nickel chloride catalyst is effected by heating at temperatures in the broad range of 300 to 700° C. and the preferred range of 400 to 600° C. in a stream of dry air or other gaseous ambient inert to the catalyst, such as flue gas, for a period of ½ to 12 hours. The presence of moisture in the gas stream decomposes some of the nickel chloride to nickel oxide so that the water content of the activation gas stream must be quite low. The activating gas should be free of $H_2$, CO or other reducing agents. The regeneration of deactivated catalyst is accomplished in a manner similar to the activation procedure. It may be necessary to contact the deactivated catalyst with a chlorine-containing compound before the high-temperature step in order to transform any nickel oxide, which may have been formed by hydrolysis of the nickel chloride, into nickel chloride.

The polymerization process using our catalyst may be carried out at temperatures which vary within a rather wide range but generally are not much lower than 0° C.

nor appreciably above about 225° C. It is preferred to operate within the range of about 25 to 150° C. Temperatures in the neighborhood of 100° C. seem to be superior since at such levels polymerization is accelerated without undue side reactions. High pressures favor the polymerization reaction, but under suitable conditions the reaction may be carried out under a very wide range of pressures, from as low as atmospheric or below, to as high as 2000 p. s. i. or above. It is preferred to operate at pressures in the range of 200 to 600 p. s. i. The space velocity depends to some extent on the other process conditions and may vary widely, but generally a gas feed space velocity of 500 to 2500 v./v./hr. is used. The reaction may be carried out in either liquid or gaseous phase, but the exothermic heat of reaction causes temperature control to be difficult in gas phase reactions. In many cases it is desirable to insure that a liquid phase is present and the reaction is carried out in the presence of an inert higher boiling material, especially a higher boiling normal paraffin or cycloparaffin. Normal butane, isobutane, or pentane are very suitable diluents in the polymerization of ethylene or propylene.

*Example*

A nickel chloride catalyst was prepared by contacting 14/28 mesh 90 percent silica-10 percent alumina cracking catalyst with a 24.5 weight percent solution of nickel chloride hexahydrate at room temperature for ½ hour. The excess liquid was removed by filtering and the catalyst was dried over low heat. The catalyst was then activated by heating for 5 hours at 482° C. with a sweep gas of dry air. The finished catalyst contained 3 to 4 weight percent nickel as nickel chloride.

A nickel oxide catalyst containing from 3 to 4 weight percent nickel was prepared in a similar manner on silica-alumina catalyst of the same kind as used to support the nickel chloride catalyst and using a 30 weight percent solution of nickel nitrate hexahydrate.

These two catalysts were used to polymerize the olefins in a cracked gas containing 34 mol percent ethylene and propylene and 0.03 to 0.04 mol percent carbon monoxide. Operating conditions were 600 p. s. i. g., 160° F., and 600 gaseous hourly space velocity. Isobutane was charged at a rate of 6 liquid hourly space velocity for heat removal and catalyst wash. The feed gas was first passed over a copper-on-pumice catalyst to remove acetylene, butadiene, and sulfur compounds. For the first thru the seventh hour onstream, the average olefin conversion with the nickel oxide catalyst was 95 mol percent as compared to a conversion of 99 mol percent with the nickel chloride catalyst. The poison rate was 5.8 percent of the catalyst bed per hour with the nickel oxide catalyst and 2.8 percent of the bed per hour with the nickel chloride catalyst.

In another test under liquid phase conditions at a temperature of 160° F., a pressure of 600 p. s. i. g., 2 liquid hourly space velocity of feed containing 25 mol percent propylene and 75 mol percent propane, the conversion was 86 percent with the nickel oxide catalyst and 95 percent with the nickel chloride catalyst.

Nickel bromide is also effective in the polymerization of olefinic hydrocarbons in accordance with the invention and the preceding disclosure with respect to nickel chloride is generally applicable to the bromide although there are certain minor differences in the activity and treatment of the two catalysts. Nickel fluoride is inoperable in the process and nickel iodide sublimes too readily and is too reactive with moisture and other feed impurities to have utility in the process.

It will be appreciated by those skilled in the art that the foregoing example merely illustrates the invention and that the same should not serve to unnecessarily limit or restrict the invention. Various modifications of the disclosed invention may be practiced without departing from the spirit and scope of the same.

We claim:

1. A process for polymerizing olefins which comprises contacting a polymerizable olefin feed under polymerizing conditions with a catalyst consisting essentially of nickel halide-silica-alumina, wherein said nickel halide is selected from the group consisting of nickel chloride and nickel bromide, so as to polymerize said olefin.

2. The process of claim 1 in which said olefin feed comprises at least one low-boiling olefin.

3. The process of claim 1 wherein the olefin feed contains a minor proportion of catalyst-poisoning impurities comprising carbon monoxide.

4. The process of claim 1 wherein the olefin feed includes a substantial proportion of ethylene.

5. The process of claim 1 wherein the olefin feed comprises essentially a mixture of ethylene and propylene.

6. The process of claim 1 in which the nickel halide is nickel chloride.

7. The process of claim 1 in which the nickel halide is nickel bromide.

8. The process of claim 1 in which the catalyst consists essentially of from 0.1 to 6 weight percent nickel chloride calculated as nickel and based on the weight of a silica-alumina carrier containing from 50 to 99 weight percent silica and from 1 to 50 weight percent alumina.

9. A process for polymerizing $C_2$ to $C_6$ olefins which comprises contacting an olefin of this class with a catalyst consisting of nickel chloride deposited on silica-alumina containing 50 to 99 weight percent silica and 1 to 50 weight percent alumina, the nickel in said nickel chloride being in the range of 0.1 to 35 weight percent of the silica-alumina, at a temperature in the range of 0 to 225° C., so as to produce polymer boiling in the gasoline range.

10. The process of claim 9 in which the temperature is in the range of 25 to 150° C. and the process is effected in liquid phase.

References Cited in the file of this patent

UNITED STATES PATENTS

| | | |
|---|---|---|
| 1,934,896 | Wagner | Nov. 14, 1933 |
| 2,286,129 | Veltman | June 9, 1942 |
| 2,436,151 | O'Kelly et al. | Feb. 17, 1948 |
| 2,581,228 | Bailey et al. | Jan. 1, 1952 |
| 2,645,620 | Paterson | July 14, 1953 |
| 2,678,904 | Kearby et al. | May 18, 1954 |